Aug. 21, 1962     A. F. HICKMAN     3,050,300
VEHICLE SPRING SUSPENSION
Filed Aug. 13, 1959     3 Sheets-Sheet 3
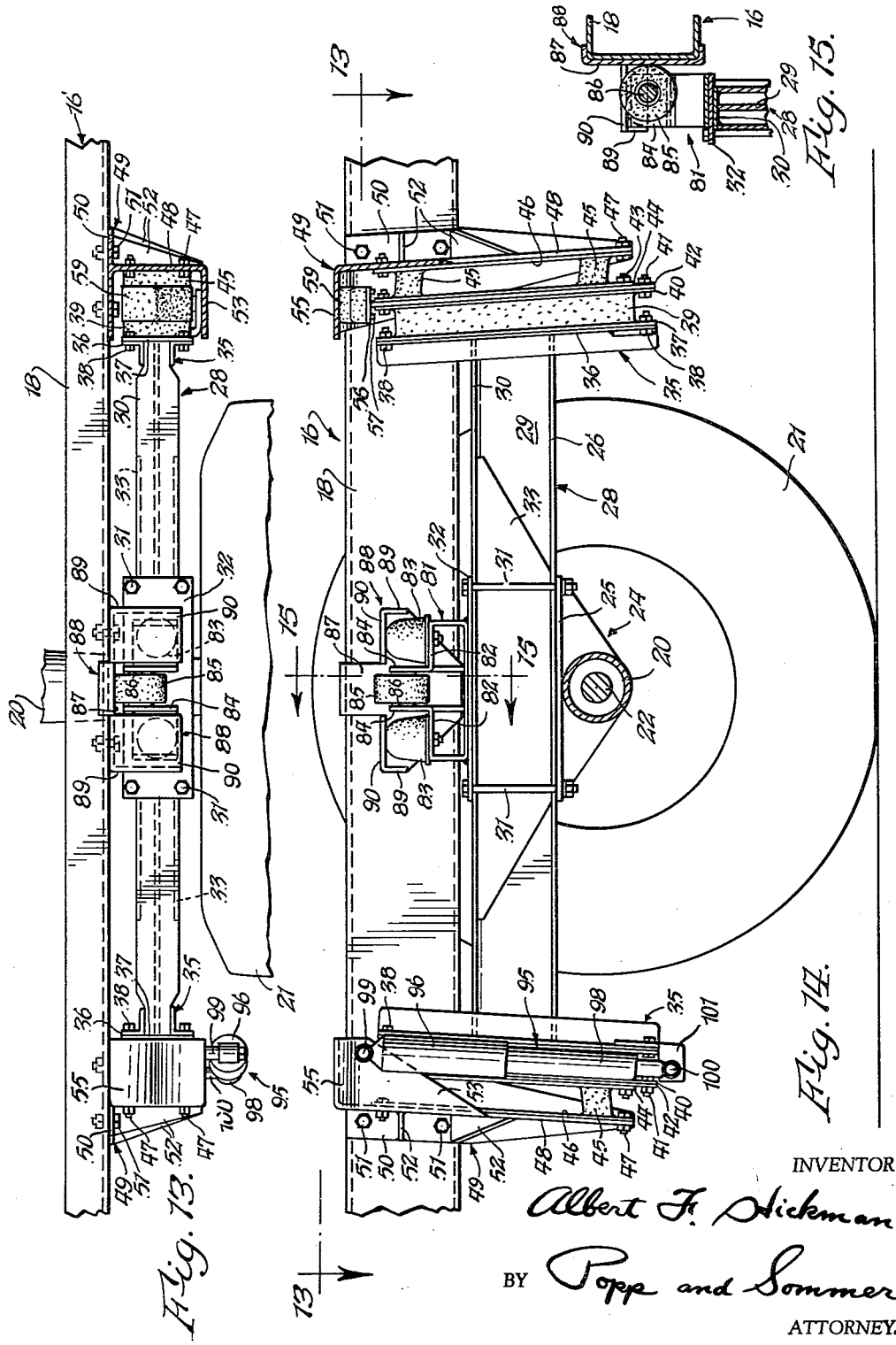
INVENTOR
Albert F. Hickman
BY Popp and Sommer
ATTORNEYS

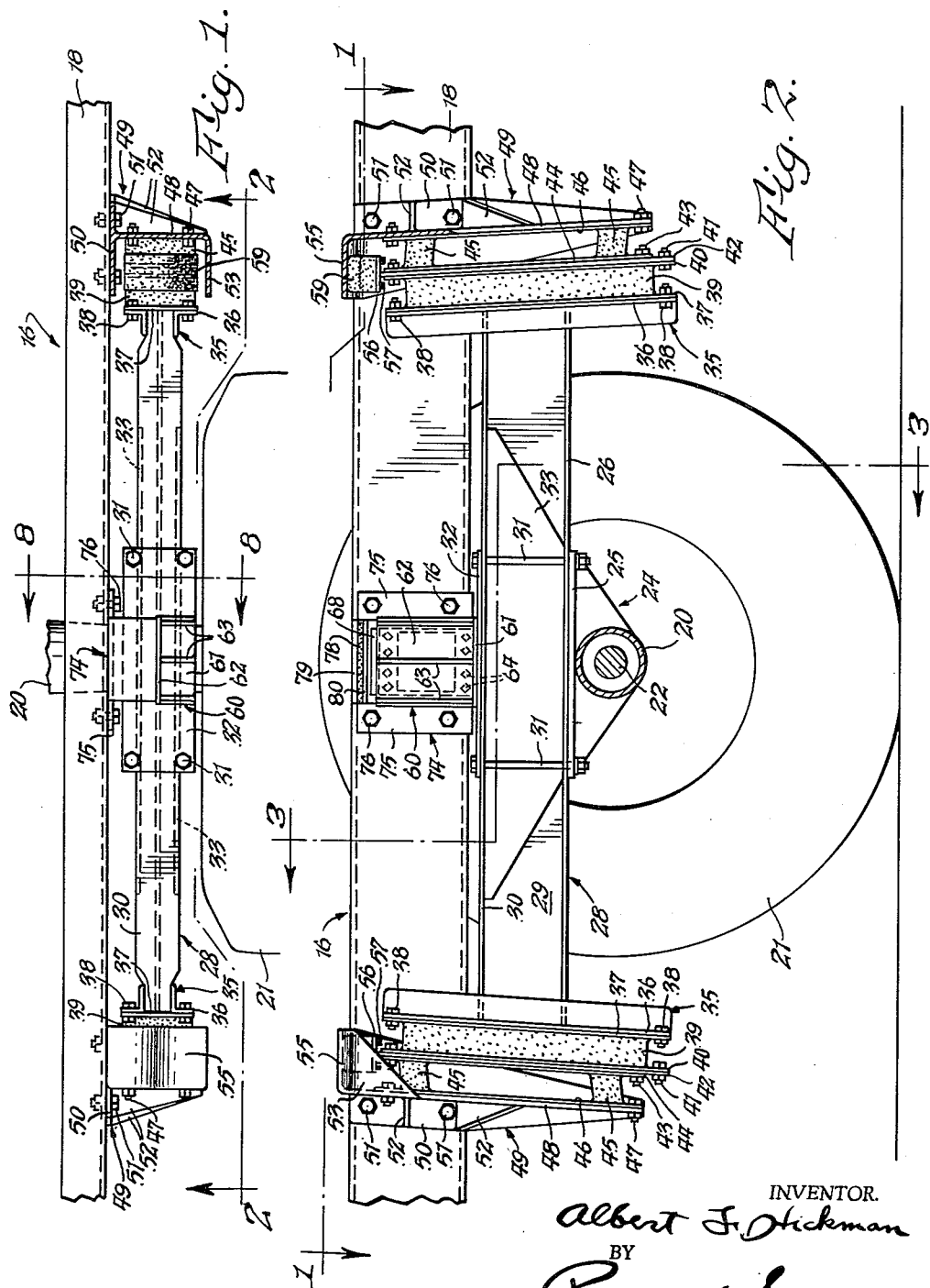

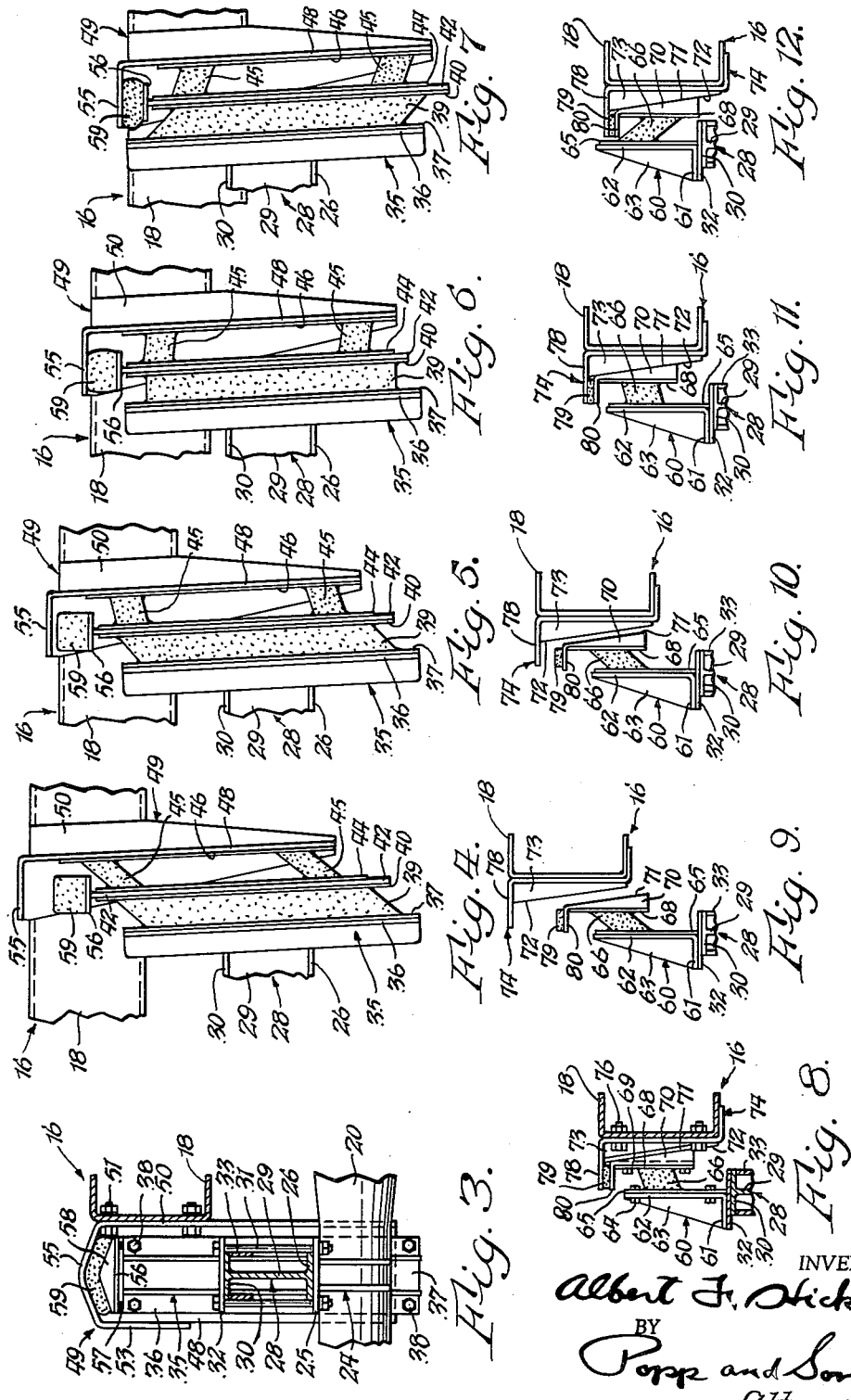

United States Patent Office 3,050,300
Patented Aug. 21, 1962

3,050,300
VEHICLE SPRING SUSPENSION
Albert F. Hickman, Eden, N.Y., assignor to Hickman Developments, Inc., Eden, N.Y., a corporation of New York
Filed Aug. 13, 1959, Ser. No. 833,514
12 Claims. (Cl. 267—63)

This invention relates to a spring suspension for vehicles of the shear rubber, rectilinear movement type and is more particularly shown as embodied in the suspension between a highway vehicle frame and the single rear driving axle thereof, although features of the invention can also be used in suspensions between a vehicle frame and a pair of tandem axles as illustrated in my earlier Patent 2,739,821, issued March 22, 1956, for Tandem Axle Spring Suspension. This application is more particularly an improvement on the single rear axle Spring Suspension for Vehicles shown in my Patent Number 2,704,664, dated March 22, 1955.

In common with said patented single rear axle spring suspension, important objects of the present invention are to provide (1) a shear rubber, rectilinear movement type of spring suspension which will permit the large amount of vertical movement necessary with highway vehicles to provide a vertical ride as soft as load heights will allow and at a low frequency both when empty and under full load, (2) which is free from friction but is automatically controlled by an increasing resistance to motion in proportion to the amplitude and velocity of relative vertical frame and wheel movement, (3) in which lateral, vertical, angular and a slight amount of longitudinal or axial axle movements, with reference to the vehicle frame, are permitted and resiliently resisted, (4) in which the resistance to such longitudinal or axial axle movement, with reference to the empty vehicle frame, is automatically controlled by an increasing resistance to motion for proportion to the amplitude and velocity of movement of the axle with reference to the frame, (5) in which the need for lubrication is eliminated, (6) in which the requirements for servicing, repair or replacement, barring accident, is eliminated for many years, (7) which is very light in weight, particularly in unsprung weight, as compared with conventional suspensions, (8) in which very little shock absorber control is required, (9) which will not interfere with vertical, lateral and vertical angular axle movement with respect to the frame, (10) which provides a much wider and higher base or support for the body than that provided by conventional leaf springs, with consequent increased stability, (11) which can be easily taken down and replaced, (12) which is low in cost both as to initial cost and also upkeep, (13) which renders radius rods, or auxiliary devices for the control of sidesway, such as torsion bar stabilizers, unnecessary and at the same time adequately resists all brake and drive torque reactions, (14) in which period vibration of the suspension is dampened out and in which wheel tramp is avoided, (15) which has a long and variable spring resistance range in both vertical, lateral and angular axle movements, (16) which employs rubber blocks or bodies in rectilinear shear in which the bond stress of the rubber is kept within safe working limits and, (17) in which rubber blocks or bodies of lesser effective cross sectional area are cut out of effective service when the axle moves a predetermined distance upwardly relative to the frame, thereby to avoid undue bond stress on these rubber blocks and concentrating the load on the larger rubber blocks.

A specific object of the present invention is to provide simple and effective means for limiting the lateral movement of the vehicle frame and body with reference to the rear axle to provide adequate sidesway control.

Another specific object is to provide such sidesway control devices which are in the form of resilient cushions interposed between the sides of the vehicle frame and structure required to achieve the general objects set forth so that adequate sidesway control is achieved at little added cost and with simple and effective devices.

Another specific object is to provide such sidesway control cushions which are arranged outside the frame so as to be widely spaced, and which are arranged a substantial distance above the axle ends so as to be at a high elevation, such high and wide spacing of these control devices giving maximum control of body sidesway with minimum resistive force.

Another object is to provide one form of such sidesway control devices which only come into action when needed, that is, when a load is placed upon the vehicle.

Another object is to provide such sidesway control devices which are noiseless in action, being in the form of rollers riding up and down the main longitudinal side frame bars of the chassis and resiliently holding the chassis in centered relation to the rear axle.

Another object is to provide such roller type of sidesway control devices in which the resilience is inherent in the rollers themselves which are made of a soft, resilient springy material, namely, rubber, for this purpose.

Another object is to provide such sidesway control devices which in action do not produce any undesirable eccentric forces, each control device being located directly above the corresponding axle end for this purpose.

Another object is to provide such sidesway control devices which remain at substantially a constant height from the ground so as to be increasingly effective as the load carried by the vehicle increases and forces the body down.

Another object is to provide a simple and effective shock absorber control to check roll frequency.

Another object is to provide such roll frequency control which requires only very light shock absorbers which essentially act to prevent such oscillating frequencies from developing rather than to handle existing body roll oscillations.

Another object is to provide such roll frequency shock absorber control in which the shock absorbers are widely placed so as to be most effective and are also arranged exteriorly of the suspension so as to be readily accessible.

Another object is to provide such roll frequency shock absorber control in which full control is provided by the use of two vertically acting shock absorbers, one at each side of the vehicle.

Another object is to provide such a roll frequency shock absorber control in which the shock absorbers can be arranged for full body roll control but with minimum control or impedance of vertical body movement.

Another object is to provide a simple bottoming bumper which acts to bring the main suspension parts to properly centered relation when the vehicle body bottoms.

Other objects and advantages of the present invention will be apparent from the following description and drawings in which:

FIG. 1 is a horizontal section taken generally on line 1—1, FIG. 2 and showing, in elevation, a top plan view of one side of a vehicle frame supported on a rear drive axle by a spring suspension embodying the present invention.

FIG. 2 is a fragmentary vertical section taken generally on line 2—2, FIG. 1 and showing the suspension and frame in elevation, the parts being shown under condition of maximum static load.

FIG. 3 is a fragmentary vertical section taken generally on line 3—3, FIG. 2.

FIGS. 4–7 are diagrammatic vertical side elevational views of one of the two series of rubber blocks or bodies connecting each end of the rear or drive axle with the frame, FIG. 4 showing the condition of these blocks under free spring conditions such as when the frame is jacked up, FIG. 5 when the truck is empty, FIG. 6 under full load, and FIG. 7 when bottoming under maximum shock load.

FIG. 8 is a fragmentary vertical section taken generally on line 8—8, FIG. 1 or showing the sidesway control cushion or stirrup in the condition when the body carries a normal load.

FIGS. 9–12 are diagrammatic views similar to FIG. 8, FIG. 9 showing the condition of the parts of the sidesway control cushion under free spring conditions, such as when the frame is jacked up, FIG. 10 when the truck is empty, FIG. 11, under full load, and FIG. 12 under maximum shock load.

FIG. 13 is a view similar to FIG. 1 showing a modified form of the invention, this section being taken on line 13—13, FIG. 14.

FIG. 14 is a view similar to FIG. 2 and illustrating the modification shown in FIG. 13, the parts being shown under conditions of maximum static load.

FIG. 15 is a fragmentary, vertical section taken generally on line 15—15, FIG. 14.

In the two forms of the invention shown, the main frame 16 of the vehicle can be of any suitable construction and is shown as comprising a pair of main longitudinal side frame bars in the form of inwardly facing channels 18, which are shown as straight and parallel and are connected by the usual frame cross bars (not shown). The entire vehicle chassis, together with the spring suspension, is constructed substantially symmetrically about a vertical longitudinal medial plane and hence it is deemed sufficient to confine the following detailed description to one rear side of the vehicle, it being understood that this description and the same reference numerals apply to the opposite rear side of the vehicle.

The present invention is directed to the suspension at the rear end of the vehicle and which is in turn supported on a rear or drive axle housing 20 in turn supported by rubber tired rear driving wheels 21 at its opposite ends, the wheels being fast to the usual pair of rear drive axles 22 connected by the usual differential (not shown) contained within the drive axle housing 20. The term "wheels" as used herein includes the rubber tires thereof and the term "axles" as used herein includes the housings thereof.

On each end of the drive axle housing 20, externally of the corresponding main longitudinal side frame bar 18, is mounted an axle bracket 24 which can be secured to the axle housing in any suitable manner and which includes a rectangular, horizontally disposed top plate 25 which is elongated lengthwise of the direction of movement of the vehicle or parallel with the adjacent main longitudinal side frame bar 18.

This top plate 25 rigidly supports the bottom flange 26 of a rigid horizontal I-beam or truss indicated generally at 28 and shown as having a vertical central web 29 and a top flange 30. This I-beam or truss 28 is preferably removably secured to the top plate 25 of the axle bracket 24 by vertical bolts 31 each extending through a corresponding corner of the top plate 25 and through a corresponding corner of a top plate 32 mounted on the top flange 30 of the I-beam or truss 28. The I-beam or truss 28 is also shown as reinforced at its center by a pair of vertical side webs 33 connecting the outer edges of the flanges 26, 30 of the I-beam at the center thereof so as to form a truss which is of box form in cross section of the center of the I-beam.

To each end of the I-beam or truss 28 one flange of a pair of upright angle irons 35 is welded to the longitudinal sides of the upper and lower flanges 30, 26 thereof. The other flanges 36 of these angle irons project outwardly relative to each other and are in coplanar relation at a slight angle to the vertical such that the pairs of angle irons 35 at opposite ends of each truss or I-beam 28 converge upwardly toward a center above the axle housing 20.

A vertically elongated rectangular metal plate 37 is secured to the coplanar external faces of the flanges 26, 30 of each pair of angle irons 35 by bolts 38, these plates 37 thereby converging upwardly with reference to each other. To the face of each of the rectangular plates 37 opposite from the corresponding pair of angle irons 35 is vulcanized a rubber body 39. The opposite face of each of these rubber bodies is vulcanized to a vertically elongated rectangular plate 40 which is connected by corner bolts 41 to an intermediate rectangular plate 42. To the opposite face of the intermediate rectangular plate 42, is bolted, by corner bolts 43, a rectangular metal plate 44. To the opposite face of each rectangular metal plate 44 are vulcanized a pair of rubber bodies 45. The opposite faces of each pair of these rubber bodies 45 are vulcanized to an outer rectangular metal plate 46.

Each outer rectangular plate 46 is attached, as by corner bolts 47, to the vertical flange 48 of a frame bracket 49, this flange projecting outwardly toward the plane of the corresponding wheel 21 from an attaching portion 50 which is shown as secured to the vertical external face of the corresponding main longitudinal side frame bar 18 by bolts 51. The vertical flange 48 is shown as reinforced by horizontal triangular webs 52 between it and the attaching portion 50 of the flange 48 and is also shown as reinforced at its outer edge by a vertical triangular flange 53 extending parallel with the main longitudinal side frame bars 18. The flanges 48 of the frame brackets 49 at opposite ends of the truss 28 converge upwardly parallel with the adjacent plates 36, 40, 42, 44 and 46.

Each pair of rubber bodies 5 provides the resilient resistance for light loads and impacts and to prevent overstressing of these pairs of rubber bodies 45 a pair of stops is provided between the intermediate plate 42 and the axle bracket 49 to limit the upward movement of the intermediate plate 42 relative to the vehicle frame. Each stop is in the form of a hood 55 formed integrally with each axle bracket 49 to project over the adjacent intermediate plate 42. Each hood is of upwardly pointed V-shaped section transversely of the line of movement of the vehicle. Below each hood the intermediate plate 42 is provided with a horizontal top plate 56 which has secured thereto, as by bolts 57, the base 58 of a bottoming bumper 59 of rubber or other soft resilient yielding material. Preferably, the base 58 of the bumper is of upwardly pointed V-shaped form to conform to the upwardly pointed V-shaped form of the hood or ridge 55.

A main feature of the present invention resides in control of the movement of the axle housing 20 lengthwise of its axis. For such control, in the form of the invention shown in FIGS. 1–12, an upstanding bracket 60 is welded to the top plate 32 of the I-beam or truss 28, this bracket having a base part 61 and an upright plate 62 which is in a plane extending lengthwise of the main longitudinal side frame bars 18. Preferably this upright plate 62 is reinforced by triangular reinforcing pieces 63 and to its face opposing the adjacent main longitudinal side frame beam 18 is secured, as by corner bolts 64, a rectangular metal plate 65. To the opposite face of this rectangular metal plate 65 is vulcanized a body or block of rubber 66, the opposite face of which is vulcanized to a rectangular metal plate 68, which is arranged parallel with a rectangular metal plate 65. To this rectangular metal plate 68 is secured, as by corner bolts 69, an angular face block 70, the working face 71 of which opposes the adjacent main longitudinal frame side beam 18 and inclines upwardly and outwardly relative thereto. This working face 71 releasably engages a companion working face 72 on a face block 73 carried by a frame bracket 74. This frame bracket is shown as having side flanges 75 secured by bolts 76 to the adjacent main longitudinal side frame beam 18, the working face 72 of the face, block 73 inclining in the same direction as the working face 71 of the face block 70, namely upwardly and outwardly. The frame bracket 74 is formed to provide a top outwardly projecting flange or shelf 78 which engages with a rubber bumper 79 provided on a similar flange 80 at the upper end of the angular face block 70.

In the operation of the suspension at the rear end of the vehicle, in the free spring condition of the body, such as when the body is jacked up, the rubber bodies and other parts are in the position illustrated diagrammatically in FIGS. 4 and 9 in which the upper and lower faces of each rubber body inclines upwardly from the plate from which pressure is applied to each rubber body to the plate against which pressure is applied by that rubber body. It will also be noted that in this free spring condition of the vehicle, the working faces 71 and 72 of the block 70 and 73, respectively, are wholly out of contact with each other.

When the vehicle is on the ground but empty, the parts are in the position shown in FIGS. 5 and 10. As shown in FIGS. 2 and 5 in this condition, a downward force is transmitted from the frame brackets 49 successively through each group of smaller rubber bodies 45, 39 to the corresponding end of each axle truss or I-beam 28 and through the axle bracket 24, axle housing 20 and wheels 21 to the ground. Since the rubber bodies 45 are of relatively small cross section, that is, a direction parallel with the plates 44, 46 to which these rubber bodies are bonded, with the body unloaded the deflection of these smaller rubber bodies 45 is greater than the larger rubber body 39. Accordingly, in the static no load condition of these rubber bodies, as illustrated in FIG. 5, the smaller rubber bodies 45 are brought to a substantial rectangular form in the vertical plane of the application of pressure, whereas the larger rubber bodies 39 are deflected only to a slight degree. Since the smaller rubber bodies 45 provide a high degree of deflection for a given load, these rubber bodies provide a desired low spring frequency when the vehicle is traveling empty or lightly loaded.

Referring to FIG. 10, it will be seen that in the unloaded condition of the body, the working faces 71 and 72 of the face blocks 70 and 73, respectively, are still out of engagement with one another. Accordingly, movement of the axle housing 20 lengthwise is not restricted by any action of the sidesway control springs 66 when the vehicle is traveling empty.

Referring to FIG. 6, when the vehicle is loaded the smaller rubber bodies 45 flex to a further extent so that their upper and lower faces incline downwardly from the plate 44 to which pressure is applied by the rubber bodies 45 to the plate 46 against which pressure is applied by these rubber bodies 45. This condition of these smaller rubber bodies 45, which represents the maximum force which can be applied to them, as illustrated in FIG. 6. This maximum stress on the two small rubber bodies 45 is limited by the rubber bumpers 59 which at this time contact the upper stop plates or hoods 55 of the frame brackets 49. Since each rubber bumper 59 is mounted on the intermeidate plate 42 interposed between each large rubber body 39 and the pair of smaller rubber bodies 45 it will be seen, as shown in FIG. 6, that further downward pressure of the body against the axles is transmitted from the top plate or hood 55 of each frame bracket 49 through the corresponding rubber bumper 59 to the intermediate plate 42 and thence through the corresponding large rubber body 39 so that excessive downward forces of the vehicle body bypass the smaller rubber bodies 45.

Referring to FIG. 11, when the vehicle is loaded, the sidesway control provided by the pair of rubber bodies 66 comes into play. Thus it will be noted that when the body is loaded the inclined working faces 71 and 72 of the face blocks 70 and 73 come into engagement. Since a pair of such face blocks are provided at each side of the vehicle, it will be seen that sidesway forces acting on the loaded body are now resisted by the rubber bodies 66 which must be compressed by such sidesway forces in order to permit any sidesway of the body. Since these rubber bodies are mounted on top of the I-beams or trusses 28, it will be seen that the sidesway control provided by these rubber bodies are at elevated points so as to be particularly effective in resisting undesirable sidesway.

When maximum shock load conditions are encountered, the vertical forces are accordingly absorbed jointly by the rubber bumper 59 which is distorted or squashed to a greater degree, as illustrated in FIG. 7 but principally by direction of the larger rubber bodies 39. Under such maximum shock conditions these larger rubber bodies 39 flex to the cross-sectional shape shown in FIG. 7 and provide the necessary resilient resistance to maximum forces of the vehicle frame against the axle.

At the same time, from FIG. 12, it will be seen that under such maximum vertical forces the rubber bodies 66, which control sidesway, are flexed so as to incline downwardly toward the center of the vehicle, the rubber bumpers 79 above these rubber bodies being compressed by the flanges 78 and 80 of the axle bracket 74 and inclined face block 70, respectively. Accordingly these rubber bodies 66 are as fully effective in sidesway control under maximum shock load conditions as they are when under fully loaded conditions and act to yieldingly resist any tendency of the body toward sidesway under such maximum shock load conditions.

It will be seen that the lighter rubber bodies 45, because of their much smaller effective cross-sectional area as compared with the large rubber bodies 39, readily flex under light load conditions and under light vertical impacts to provide the desired ride when the truck is traveling empty or lightly loaded. The amplitude of axle movement permitted by these light rubber bodies 45 under light load conditions provides a low frequency at the rear end of conventional trucks when empty. It will also be seen that under such empty or light load conditions, the rubber bodies 66 which control sidesway are completely ineffective sidesway control not being required at this time.

When the truck is loaded, however, and subjected to heavier vertical load impacts, these light rubber bodies 45 are prevented from being overstressed and are cut out of service by engagement of the bumpers 59 with the frame brackets 49 which positively limit the upward movement of the intermediate plate 42 and hence the amount of force which can be impressed on these light rubber bodies 45 and the degree of distortion thereof. Accordingly, when the truck is fully loaded, further downward impacts of the frame at each end of the axle housing 20 are yieldingly resisted by the main rubber bodies 39 and under such conditions these rubber bodies provide a low ride frequency for the loaded truck. When the truck is loaded, the working faces 71, 72 of the face blocks 70 and 73 come into engagement with each other and the rubber bodies 66 are placed under compression as shown in FIG. 11. Accordingly, these rubber bodies 66 now resist sidesway movement of the body from elevated positions so as to be highly effective in controlling sidesway of the loaded body. These rubber bodies 66 remain effective, as illustrated in FIG. 12, when maximum shock load conditions are encountered as illustrated in FIG. 11 and when the rubber bumpers 79 come into more active service.

Angular movement of the axle housing 20, that is, when one wheel 21 rises relative to the opposite wheel, is also resiliently resisted by the rubber bodies 39 and 45. This angular movement is also resisted by the rubber bodies 66 when the truck is loaded. Thus, the vertical component of such angular movement is resisted essentially by the light or smaller rubber bodies 45 under light load and impact conditions and by the main or large rubber bodies 39 under heavy load or impact conditions in the same manner as previously described for vertical axle movement. At the same time, when the body is loaded, the horizontal component of such angular axle movement is resisted essentially by the small rubber bodies 45 under light load and impact conditions and by the heavier rubber bodies 39 under load or heavy impact conditions in the same manner as previously described for lateral axle movement relative to the frame. Under load and maximum impact conditions, it will be seen from FIGS. 11 and 12 that the rubber bodies 66 also resiliently resist such angular axle movement.

The rubber bodies 39 and 45, and the rubber bodies 66, when effective, also permit a limited movement of the axle housing 20 longitudinally of the frame 16. While the rubber bodies 39 and 45 are essentially shear springs acting at right angles to such axle movement lengthwise of the frame, the optimum axle movement lengthwise of the frame is very small, in the order of a small fraction of an inch, and these blocks compress to provide such small movement. Some such resiliently permitted movement is essential, however, as against sledge hammer blows of the axle housing 20 lengthwise of the direction of movement of the frame 16 and to provide some degree of flexibility in all directions.

Since the rubber bodies 39 and 45 are interposed between the plates 37, 40, 42, 44 and 46 which, at opposite ends of the I-beam or truss 28, converge upwardly toward one another, it will be seen that the downward movement of the frame brackets 49 effects a wedging action on these rubber blocks or bodies. This wedging action increases as the load increases. This wedging action greatly increases the load capacity of the rubber bodies 39 and 45 vulcanized to their rectangular metal plates and through which the rubber bodies and plates the frame brackets are secured to the axle structures or trusses 28. This wedging action also eliminates the cost of an adjusting mechanism for the initial stress imposed upon the rubber bodies and simplifies the mounting problems by the elimination of such adjustment. It also improves the resistance curve of the suspension at the rear of the body since the resistance is more nearly constant at the start of deflection and increases, through compression of the rubber bodies, as the deflection increases.

A particular feature of the form of the invention shown in FIGS. 1–12 is the stirrups or lateral stabilizers including the rubber blocks 66 which limit the lateral movement of the body in relation to the axle. From FIGS. 5 and 7 it will be noted that when the vehicle is light or unloaded these stabilizers do not support the vehicle body or limit the lateral movement of the body under normal circumstances. However, as the load is applied the gap between the working faces 71, 72 of the face blocks 70, 73 closes until the stirrups or lateral stabilizers are in full operation. Desirably this occurs when the vehicle has about a 50 percent load. The rubber blocks 66 which provide the springs for the stirrups or lateral stabilizers can be made of any capacity necessary to produce the desired control.

It will also particularly be noted that these stirrups or lateral stabilizing devices are secured on top of the axle trusses or I-beams 28 and hence remain at a constant height from the ground and automatically become higher in relation to the center of gravity of the sprung mass as the load is applied. In other words, as the vehicle body is loaded the frame 16 lowers and hence these stirrups or lateral stabilizing devices become increasingly effective as the need for lateral stabilization increases.

It will also be noted that by providing an upwardly pointed V-shaped mounting 58 for the bottoming bumpers 59 and by having these bumpers work against a hood 55 having a complementary downwardly opening V-shaped channel, the bumpers, as shown in FIG. 3, serve two purposes, namely, to limit distortion of the lighter spring blocks 45 and prevent overstressing thereof and at the same time to center both ends of the trusses or I-beams 28 thereby to bring the major parts of the spring suspension into centered relation when bottoming occurs.

Referring to the form of the invention shown in FIGS. 13–15, it will be noted that a bracket 81 is mounted on top of the top plate 32 of each truss or I-beam 28 and that this bracket is formed to provide horizontal end seats 82 on which bottoming bumpers 83 are mounted. Between these two bottoming bumpers the bracket 81 is provided with a pair of upstanding ears 84 between which is journalled a resilient rubber roller 85. The shaft for this resilient rubber roller 85 is indicated at 86 and preferably it is journalled in bearings of sintered metal impregnated with oil so that these rollers present no lubrication problem.

The periphery of the rubber roller 85 works against the vertical central face 87 of a frame bracket 88 secured to each main longitudinal side frame beam 18 of the truck frame. This frame bracket also has fore-and-aft extensions 89 from which horizontal flanges or shelves 90 protrude and which are arranged above the bumpers 83. It will be seen that these flanges or shelves 90 directly limit the upward movement of the corresponding axle end by engaging and limiting the upward movement of the rubber bumpers 83.

The rollers 85, on opposite sides of the vehicle frame 16 limit the lateral movement of the vehicle frame in relation to the rear axle and hence control sidesway. These rollers are desirably located as high as practicable so as to not interfere with any body cross members (not shown) when the maximum load is carried by the body and when the body bottoms under maximum shock conditions. By mounting these rollers on the axles these rollers remain at a constant height so that that payload increased and the vehicle frame 16 moves downwardly these rollers become increasingly effective in sidesway control since their elevation in relation to the center of gravity of the sprung mass increases. This is in distinct contrast to a leaf spring suspension where the ends of the springs move downwardly as the load is applied. It will be seen that by arranging these rollers 85 directly over the axles no eccentric forces are created when they come into action and also these rollers have a uniform radial loading so as to insure long life of their bearings. In contrast to this direct radial loading of the rollers 85, with a leaf spring and shackle suspension the lateral thrusts of the body and load results in heavy corner loading of the shackle bearings to reduce their effective life.

In the form of the invention shown in FIGS. 13–15 shock absorber control is provided to prevent the start and development of a body roll frequency or oscillation. To this end a telescoping type of hydraulic shock absorber 95 is placed at one end of each of the trusses or I-beams 28 of the suspension. Each shock absorber can be of conventional construction and includes an outer telescoping member 96 and an inner telescoping member 98. Each shock absorber is arranged to act vertically and for this purpose is secured, by means of a pivot pin 99 to the hood 55 of the adjacent frame bracket 49 and is secured at its lower end by means of a pin 100 to a bracket 101 at the lower end of one of the corresponding angle iron 35 of the truss or I-beam 28. Desirably the shock absorbers 95 are located outside of the frame brackets 49 and the rubber bodies 39 and 45 of the spring suspension to be readily accessible and also to have maximum effect in checking the start of any roll frequency of the body. This roll frequency is in the nature of a pendulum action of the body which can develop when the body is heavily laden. Such roll frequency is usually around 30 cycles per minute and usually develops on smooth roads and is stopped when rougher roads are encountered. Inboard shock absorbers of double or triple the capacity of the shock absorbers 95 shown were found not to correct this undesirable rolling action of the body and which can become annoying and even nauseating to the driver. This was because with a wide body and a high load inboard shock absorbers were too close to the center of oscillation.

By placing the shock absorbers 95 outside of the spring suspension and remote from the center of oscillation very light or low capacity shock absorbers 95 were found to completely prevent roll frequency from developing with the heaviest and highest loads. Also this location of the shock absorbers renders them convenient to service or change when necessary.

It will be noted that only one shock absorber 95 is required at each end of each axle. In order to secure the maximum control by these shock absorbers 95 when both wheels 21 go over a road undulation, one shock absorber 95 is placed at the forward end of the I-beam or truss 28 at one side of the vehicle and the other shock absorber is placed at the rear end of the I-beam or truss 28 at the opposite side of the vehicle. With this mounting the roll control is satisfactory and the maximum control is provided when both rear wheels of the truss encounter similar undulation at the same time. If in some instances it is desired to retain the maximum roll control but with less vertical body control, the shock absorbers 95 can be mounted at the forward ends of the I-beams or trusses 28 at both sides of the vehicle. By such mounting the maximum roll control is retained but due to the fact that the rear ends of the axle I-beams or trusses 28 are left uncontrolled by shock absorbers and are only controlled by the friction-free rubber springs, a freer vertical movement is provided while still retaining adequate roll control.

By "rubber" as used in the foregoing specification is meant both natural rubber and synthetic rubber as well as mixtures of natural and synthetic rubber.

What is claimed is:

1. In a vehicle spring suspension interposed between the frame of a highway vehicle having main longitudinal side frame bars and the suspension having an axle having a wheel journalled thereon and spring means resiliently supporting said frame on said axle and permitting lateral movement of said frame lengthwise of said axle; the combination therewith of means resiliently resisting sidesway of said frame, comprising bracket means fixed to and projecting upwardly from each end of said axle substantially in centered relation thereto and having a portion extending above the level of the bottom of the corresponding main longitudinal side frame bar and opposing the side face thereof, and a resilient cushion means arranged substantially equally on opposite sides of a vertical plane intersecting the axis of said axle and interposed between said portion of each bracket means and the adjacent opposing side of said frame to be compressed horizontally between said bracket means and a frame.

2. In a vehicle spring suspension interposed between the frame of a highway vehicle having main longitudinal side frame bars and the suspension having an axle having a wheel journalled thereon and spring means resiliently supporting said frame on said axle and permitting lateral movement of said frame lengthwise of said axle; the combination therewith of means resiliently resisting sidesway of said frame, comprising bracket means fixed to and projecting upwardly from each end of said axle substantially in centered relation thereto and having a portion extending above the level of the bottom of the corresponding main longitudinal side frame bar and opposing the side face thereof, and a compressively resilient cushion member arranged substantially equally on opposite sides of a vertical plane intersecting the axis of said axle and; mounted on said portion of each bracket means to move vertically therewith, said cushion members projecting toward and being compressed horizontally by said frame in response to sidesway forces imposed upon said frame by said axle.

3. In a vehicle spring suspension interposed between the frame of a highway vehicle having main longitudinal side frame bars and the suspension having an axle having a wheel journalled thereon and spring means resiliently supporting said frame on said axle and permitting lateral movement of said frame lengthwise of said axle; the combination therewith of means resiliently resisting sidesway of said frame, comprising bracket means fixed to and projecting upwardly from each end of said axle substantially in centered relation thereto and having a portion extending above the level of the bottom of the corresponding main longitudinal side frame bar and opposing the side face thereof, and a roller journalled on said portion of each bracket means on a generally horizontal axis extending transversely of the axle, said rollers operatively engaging the exterior sides of said main longitudinal side frame bars to counteract sidesway forces imposed on said frame.

4. In a vehicle spring suspension interposed between the frame of a highway vehicle having main longitudinal side frame bars and the suspension having an axle having a wheel journalled thereon and spring means resiliently supporting said frame on said axle and permitting lateral movement of said frame lengthwise of said axle; the combination therewith of means resisting side movement of said frame, comprising bracket means fixed to and projecting upwardly from each end of said axle substantially in centered relation thereto and having a portion extending above the level of the bottom of the corresponding main longitudinal side frame bar and opposing the side face thereof, and a roller journalled on said portion of each bracket means on a generally horizontal axis extending transversely of the axle, the periphery of said roller riding on the exterior sides of said frame to counteract sidesway forces imposed on said frame.

5. In a vehicle spring suspension interposed between the frame of a highway vehicle having main longitudinal side frame bars and the suspension having an axle having a wheel journalled thereon and spring means resiliently supportinge said frame on said axle and permitting lateral movement of said frame lengthwise of said axle; the combination therewith of means resiliently resisting sidesway of said frame, comprising a bracket fixed to and projecting upwardly from each end of said axle and arranged alongside and exteriorly of said frame, and a resilient rubber block having one vertical face fixed to said portion of each bracket and its opposite vertical face opposing the exterior of said frame, and means arranged to bring said frame into and out of compressive relation with said opposite vertical faces when a load is placed on said frame to lower the same relative to said axle.

6. In a vehicle spring suspension interposed between the frame of a highway vehicle having main longitudinal side frame bars and the suspension having an axle having a wheel journalled thereon and spring means resiliently supporting said frame on said axle and permitting lateral movement of said frame lengthwise of said axle; the combination therewith of means resiliently resisting sidesway of said frame, comprising a bracket fixed to and projecting upwardly from each end of said axle and having a portion extending above the level of the bottom of the corresponding main longitudinal side frame bar and opposing the side face thereof, and a resilient rubber block having one vertical face fixed to each bracket and its opposite vertical face opposing the exterior of said frame, a wedge block fast to each said opposite vertical face, and a wedge block fixed to each side of said frame in the paths of said first mentioned wedge blocks and arranged to compressively engage said first mentioned wedge blocks when a load is placed on said frame to lower the same relative to said axle.

7. In a vehicle spring suspension interposed between the frame of a highway vehicle having main longitudinal side frame bars and the suspension having an axle having a wheel journalled thereon, said suspension having a generally horizontal beam fixed to each end of said axle to project transversely from opposite sides thereof, frame brackets on said frame severally opposing the ends of said beam and shear rubber bodies connecting the ends of said beams with said frame brackets; the combination therewith of means resisting side movement of said frame, comprising a bracket arranged fixed to each beam and projecting upwardly from the center of said axle and having a portion extending above the level of the bottom of the corresponding main longitudinal side frame bar and opposing the side face thereof, and a roller journalled on said portion of each bracket on a generally horizontal axis extending transversely of the axle, said rollers operatively engaging the exterior sides of said main longitudinal side frame bars to counteract sidesway forces imposed on said main longitudinal side frame bars.

8. In a vehicle spring suspension interposed between the frame of a highway vehicle having main longitudinal side frame bars and the suspension having an axle having a wheel journalled thereon, said suspension having a generally horizontal beam fixed to each end of said axle to project transversely from opposite sides thereof, frame brackets on said frame severally opposing the ends of said beam and shear rubber bodies connecting the ends of said beams with said frame brackets; the combination therewith of means resiliently resisting sidesway of said frame, comprising a bracket arranged fixed to each beam and projecting upwardly from the center of said axle and having a portion extending above the level of the bottom of the corresponding main longitudinal side frame bar and opposing the side face thereof, and a resilient rubber block having one vertical face fixed to said portion of each bracket and its opposite vertical face opposing the exterior of said main longitudinal side frame bars, and means arranged to bring said main longitudinal side frame bars into compressive relation with said opposite vertical faces when a load is placed on said frame to lower the same relative to said axle.

9. In a vehicle spring suspension interposed between the frame of a highway vehicle and an axle having a wheel journalled thereon, said suspension having a generally horizontal beam fixed to each end of said axle to project transversely from opposite sides thereof, frame brackets on said frame severally opposing the ends of said beam and shear rubber bodies connecting the ends of said beams with said frame brackets, the combination therewith of means preventing the development of body roll frequencies of said frame, comprising a vertically acting shock absorber interposed between said frame and at least one end extremity of one of said beams alongside the corresponding rubber bodies.

10. In a vehicle spring suspension interposed between the frame of a highway vehicle and an axle having a wheel journalled thereon, said suspension having a generally horizontal beam fixed to each end of said axle to project transversely from opposite sides thereof, frame brackets on said frame severally opposing the ends of said beam and shear rubber bodies connecting the ends of said beams with said frame brackets, the combination therewith of means preventing the development of body roll frequencies of said frame, comprising a vertically acting shock absorber at each side of said frame operatively interposed between one end extremity of the corresponding beam and the corresponding frame bracket.

11. In a vehicle spring suspension interposed between the frame of a highway vehicle having main longitudinal side frame bars and said suspension also having an axle having a wheel journalled thereon and spring means resiliently supporting said frame on said axle and permitting lateral movement of said frame lengthwise of said axle; the combination therewith of means resiliently resisting sidesway of said frame, comprising a first bracket mounted on said axle and having a portion extending above the level of the bottom of the corresponding main longitudinal side frame bar and opposing the side face thereof, a second bracket mounted on said side face of said main longitudinal side frame bar in horizontal alinement with said portion of said first bracket and in the path thereof when said axle moves lengthwise of its axis, a block of soft resilient plastic material such as rubber fixed to one of said brackets in line with said portion of said first bracket and having a face extending transversely of said axle and opposing the other bracket, and a plate fixed to said face of said block and being arranged in spaced relation to an opposing face of said other bracket, said plate engaging said opposing face of said other bracket to limit the transverse movement of the frame lengthwise of said axle.

12. The combination set forth in claim 11 wherein said plate and said opposing face of said other bracket are parallel and inclined relative to the vertical in such direction as to effect release of said plate and said opposing face of said other bracket from each other when the frame is empty and to effect engagement of said faces when said frame is loaded.

References Cited in the file of this patent

UNITED STATES PATENTS

| | | |
|---|---|---|
| 770,727 | Madden | Jan. 13, 1904 |
| 2,641,463 | Mulcahy | June 9, 1953 |
| 2,704,664 | Hickman | Mar. 22, 1955 |
| 2,742,302 | Pointer | Apr. 17, 1956 |
| 2,758,832 | Hickman | Aug. 14, 1956 |
| 2,865,652 | Easton | Dec. 23, 1958 |
| 2,913,252 | Norrie | Nov. 17, 1959 |
| 2,933,329 | Heinmiller et al. | Apr. 19, 1960 |